Figure 1:
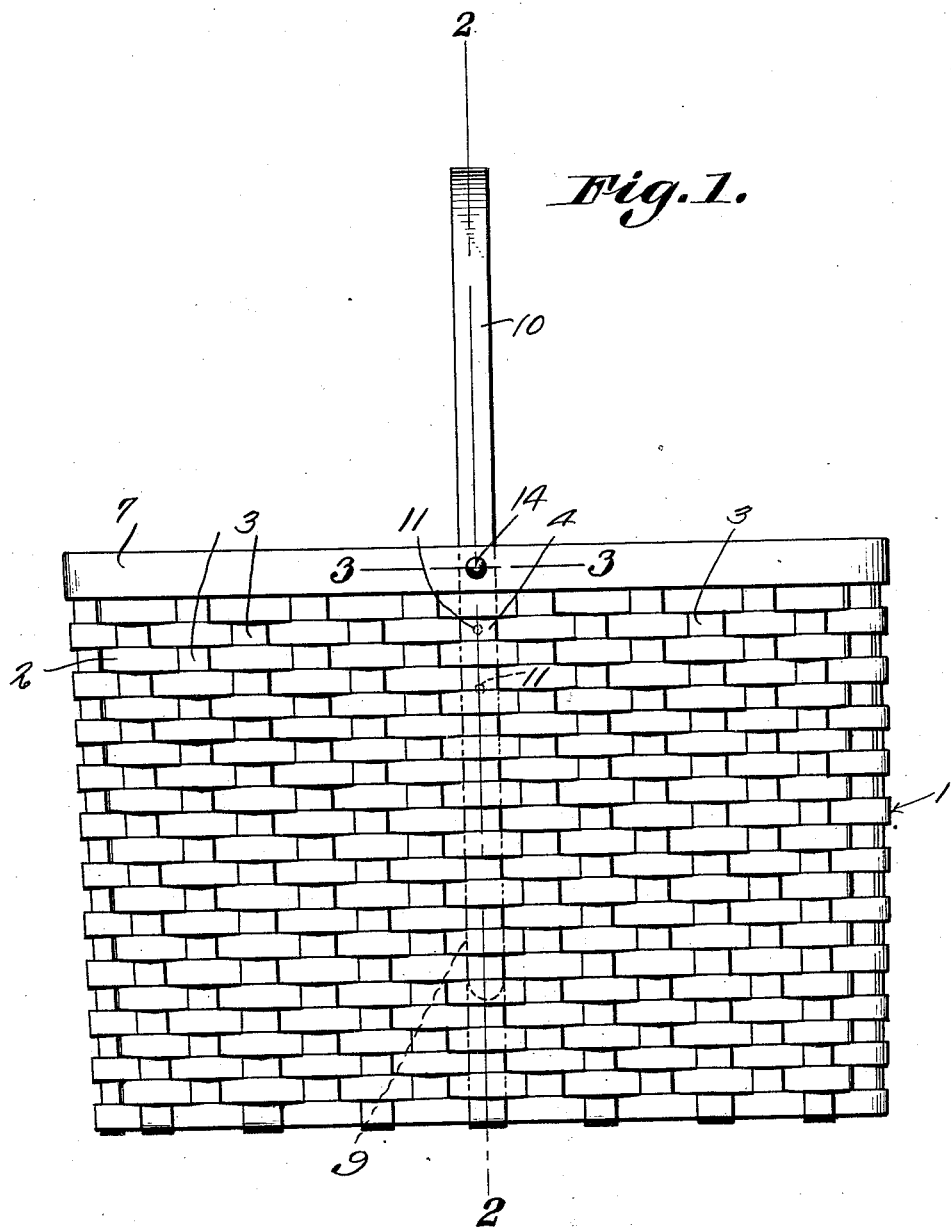

March 8, 1932. C. L. HOOVER 1,848,218
REMOVABLE AND ADJUSTABLE HANDLE FOR BASKETS
Filed Jan. 27, 1930 2 Sheets-Sheet 1

Inventor
C. L. Hoover
By C. A. Snow & Co.
Attorneys.

March 8, 1932. C. L. HOOVER 1,848,218
REMOVABLE AND ADJUSTABLE HANDLE FOR BASKETS
Filed Jan. 27, 1930 2 Sheets-Sheet 2
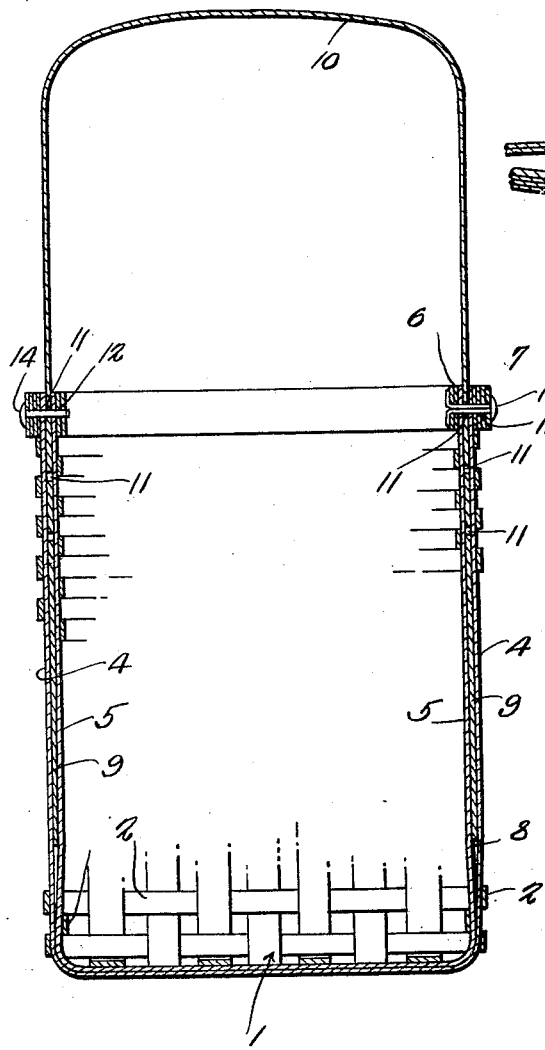
Inventor
C. L. Hoover
By C. A. Snow & Co.
Attorneys.

Patented Mar. 8, 1932

1,848,218

UNITED STATES PATENT OFFICE

CHESTER LEROY HOOVER, OF WARSAW, INDIANA

REMOVABLE AND ADJUSTABLE HANDLE FOR BASKETS

Application filed January 27, 1930. Serial No. 423,786.

This invention aims to provide a means whereby a basket handle may be assembled adjustably and removably with the body of the basket, it being possible to ship the article knock-down, and assemble the handle with the body when occasion requires, and it being possible, also, to make the handle of greater or less height, when it is mounted on the body.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a basket constructed in accordance with the invention;

Figures 2 and 3 are sections taken, respectively, on the lines 2—2 and 3—3 of Figure 1, parts of the basket body being omitted in Figure 3, for the sake of clearness;

Figure 4 is a sectional detail on the line 2—2, this view, however, showing certain parts which have been removed in Figure 1.

The numeral 1 marks a basket body including longitudinal strips 2 interwoven with transverse strips 3 and 4. Inner transverse strips 5 are aligned with the outer transverse strips 4 and are spaced therefrom to form pockets 8. An inner rim 6 and an outer rim 7 are secured to the edge of the basket body 1. The upper ends of the strips 4 and 5 are extended to form diverging fingers 15 defining entering throats 16 that communicate with the pockets 8 and facilitate the insertion of the ends 9 of a bail shaped handle 10 into the pockets. In the rims 6 and 7, and in the transverse strips 4 and 5, there are aligned openings 12.

The ends 9 of the handle 10 have longitudinally spaced openings 11 which may be brought into registration with the openings 12, to vary the height of the handle 10, and through the registering openings 11 and 12, a fastener 14 may be inserted. Any kind of a fastener may be used, but a cotter pin will be found useful.

The article can be shipped with the handle 10 detached, and the handle may be mounted in place as occasion may require. Some prefer to clip off the fingers 15, after the handle is in place, and this construction is shown in Figures 1 and 2 of the drawings.

Having thus described the invention, what is claimed is:

1. A basket comprising a body and a handle, the body including longitudinal strips and inner and outer transverse strips interwoven with the longitudinal strips, the said transverse strips being spaced to form pockets and being extended upwardly beyond the upper edge of the body to form diverging fingers defining entering throats leading to the pockets, the ends of the handle being insertable into the pockets by way of the throats, and means for fastening the ends of the handle in the pockets.

2. A basket comprising a body including horizontal strips and a pair of separate inner and outer vertical strips at opposite sides of the basket and interwoven with the horizontal strips, the separate vertical strips of each pair being in alinement transversely, each vertical strip of each pair having free longitudinal outer edges, a handle having its ends disposed between the strips of each pair, and removable securing devices passing through and mounted in the ends of the handle and passing through and mounted in both vertical strips of each pair.

In testimony that I claim the foregoing as my own, I have hereto affixed my signature.

CHESTER L. HOOVER.